J. CORBIN.
Grain-Drier.
No. 205,530. Patented July 2, 1878.
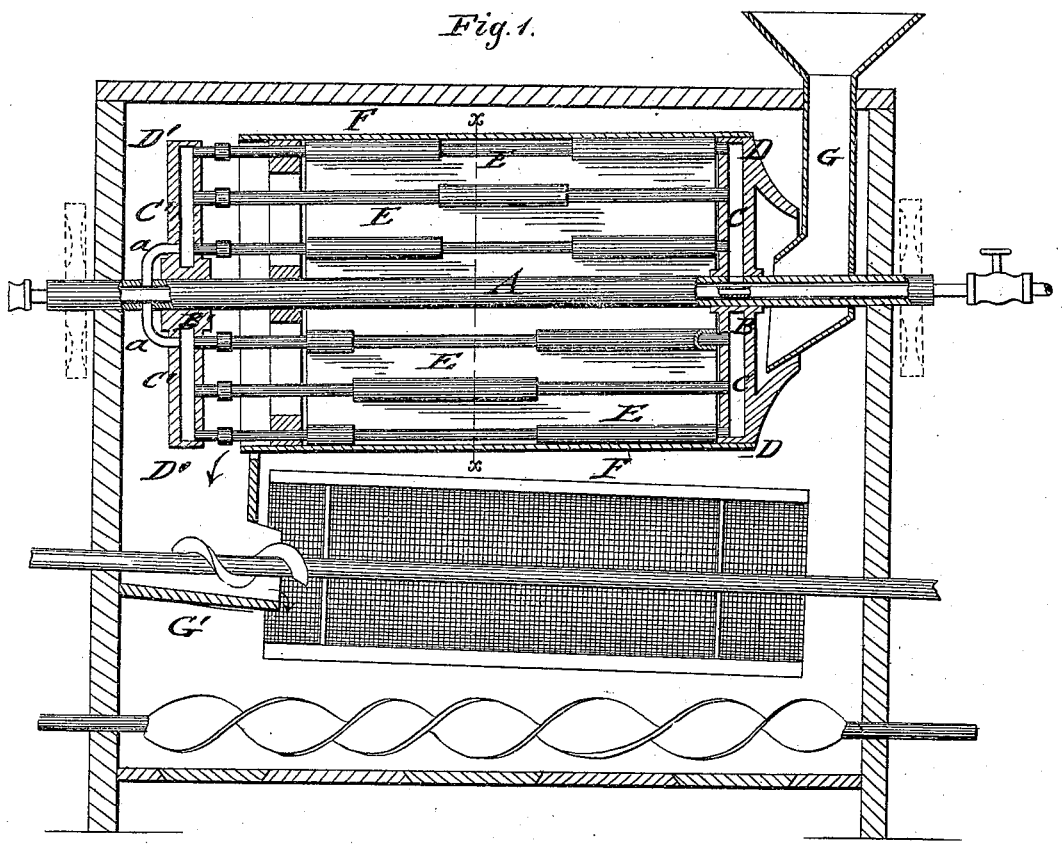
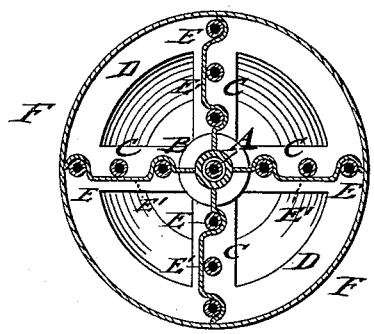
WITNESSES:
Henry N. Miller
C. Sedgwick
INVENTOR:
J. Corbin
BY
ATTORNEYS.

UNITED STATES PATENT OFFICE.

JOHN CORBIN, OF NEW HARMONY, INDIANA.

IMPROVEMENT IN GRAIN-DRIERS.

Specification forming part of Letters Patent No. 205,530, dated July 2, 1878; application filed May 28, 1878.

*To all whom it may concern:*

Be it known that I, JOHN CORBIN, of New Harmony, in the county of Posey and State of Indiana, have invented a new and Improved Grain-Drier, of which the following is a specification:

In the accompanying drawing, Figure 1 represents a vertical longitudinal section, and Fig. 2 a vertical transverse section on line $xx$, Fig. 1, of my improved grain-drier.

Similar letters of reference indicate corresponding parts.

This invention relates to an improved machine for drying grain, flour, meal, malt, sugar, and similar articles by the use of steam; and the invention consists of a revolving hollow center shaft having steam supply and exhaust pipes, in connection with a fixed hollow ring and hollow radial arms at one end of the shaft, and with a loose adjustable hollow ring applied by hollow arms and a sliding hub to the shaft. The loose ring is connected by flexible pipes with the center shaft, and the rings and arms are longitudinally connected by steam-pipes jointed thereto, and finally inclosed by an outer cylindrical drum or jacket. The grain is conveyed by a suitable spout into the conical end of the revolving cylinder, and dropped at the opposite end into a conducting-spout, and then into the bolting-reel. The space between the connecting-pipes of the arms is closed by sheet metal, so as to form partitions in the drier for the passage of the grain.

Referring to the drawing, A is a hollow center shaft, of any suitable length, to which steam is conveyed by a supply-pipe, which is connected to the boiler, and applied to the shaft by means of a stuffing-box, so that the shaft may revolve while the pipe remains stationary. The hollow shaft A revolves in bearings of the supporting-frame of the drier, and is provided at the opposite end with a similar stuffing-box and exit-pipe for the exhaust-steam and the water of condensation.

To one end of the center shaft is keyed a hub, B, from which hollow radial arms C extend, which are connected at their extremities by a hollow ring, D, the hub, arms, and ring being cast in one piece. The shaft communicates by small holes with the radial arms C, so as to permit the steam to pass through the hollow arms into the hollow ring D.

A second hub, B', with radial arms C' and ring D', is arranged at the opposite end of the hollow center shaft, but not fixed thereto, but fitted loosely to the shaft by a feather-key that keys it axially, but does not prevent it from sliding in longitudinal direction upon the shaft. The hollow arms of this second ring are connected with the hollow center shaft by one or more flexible pipes, $a$.

The two hollow rings D D' are longitudinally connected by pipes E of an inch or more in diameter, which pipes are screwed into the faces of the rings by means of right and left hand screw-threads. The pipes are made of any suitable length, and are connected to the loose drum by means of union-joints or other couplings, so as to provide for the unequal contraction and expansion, and facilitate the construction and repair of the drier.

The connecting-pipes E are inclosed by a sheet-metal jacket or cylinder, F, that is fastened to a flange of the fixed ring D, so as to revolve with the center shaft. The jacket is supported at intermediate points by radial arms, but is not fastened to the loose ring, so as to be torn by the unequal contraction and expansion of the pipes and jacket. An open space between the loose ring and the outer edge of the jacket admits the passing off of the grain or other article that is worked through the drier.

The radial arms are also connected by means of pipes E, and the space between these pipes filled up with metal partitions E', that divide the cylinder into a number of compartments, by which the heating-surface is greatly increased and the running of the machine made easier, as each of these compartments is equally charged with grain.

The material passing through the drier is confined in the different compartments, and is kept continually in contact with the surface of the heated pipes of the rings and radial arms, and with the surface of the center shaft, so as to produce a more superior drying action thereon, than if it were continually revolved in the open cylinder.

The fixed ring D is arranged at the outside with a conical extension, into which is inserted the supply-spout G, that conveys the grain or other material to be dried into the revolving drying-cylinder. The bottom spout G', at the opposite lower end of the drier, takes up the dried material and conducts it to the bolting-reel arranged below the drier. As the cylinder is supported at suitable inclination toward the lower conducting-spout, the water of condensation may be conveniently drawn off by a suitable stop-cock of the loose ring, and thereby freezing in cold weather prevented. A condenser may also be attached to the lower end of the hollow center shaft, so as to keep the machine clear of water at all times. As the steam passes through the entire system of circumferential and radial pipes, the material is dried as it is gradually worked through the inclined cylinder. The grain is kept continually in contact with the heating-pipes, and at the same time a thorough ventilation furnished, as both ends of the cylinder are open.

Having thus described my invention, I claim as new and desire to secure by Letters Patent—

1. In a grain-drier, the combination, with a top supply-spout and a bottom conducting-spout at opposite ends, of an inclined revolving drier, consisting of a fixed or stationary hollow ring and a loose or sliding hollow ring, applied by hollow radial arms to the inclined hollow center shaft, and connected by longitudinal connecting-pipes, the pipes being surrounded by a cylindrical jacket having a conical extension around the supply-spout, and being open above the discharge-spout, substantially as set forth.

2. The combination, with a hollow inclined center shaft, of a fixed or stationary hollow ring and a loose or sliding hollow ring applied to the shaft by hollow radial arms, and connected by longitudinal pipes of the rings and arms, substantially as set forth.

3. The combination of the loose hollow end ring, applied by radial arms and axially-keyed hub to the center shaft, with the hollow center shaft and flexible connecting-pipes, substantially as set forth.

4. The combination, in a grain-drier, of a hollow center shaft, having fixed and loose rings and hollow radial arms, both connected by longitudinal steam-pipes, with a jacket or cylinder attached to the fixed ring, substantially as set forth.

5. The combination, in a grain-drier, of a hollow center shaft, having a fixed ring at one end and an adjustable ring at the opposite end, applied by hollow arms to the shaft, with longitudinal steam-pipes, connecting rings and arms, an exterior encircling jacket, and with radial partitions between the pipes of the arms, substantially as specified.

JOHN CORBIN.

Witnesses:
  A. H. FRETAGEOT,
  CHAS. W. SLATER.